US012634964B2

(12) United States Patent (10) Patent No.: US 12,634,964 B2
Wu et al. (45) Date of Patent: May 19, 2026

(54) METHOD FOR DETERMINING CHANNEL ACCESS PARAMETER, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zuomin Wu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 655 days.

(21) Appl. No.: 18/087,553

(22) Filed: Dec. 22, 2022

(65) Prior Publication Data

US 2023/0224933 A1 Jul. 13, 2023

Related U.S. Application Data

(63) Continuation of application No. PCT/CN2020/132965, filed on Nov. 30, 2020.

(51) Int. Cl.
*H04W 72/40* (2023.01)
*H04W 72/1273* (2023.01)

(52) U.S. Cl.
CPC ....... *H04W 72/40* (2023.01); *H04W 72/1273* (2013.01)

(58) Field of Classification Search
CPC ........................... H04W 72/40; H04W 72/1273
See application file for complete search history.

(56) References Cited

U.S. PATENT DOCUMENTS

2019/0349908 A1 11/2019 Talarico et al.
2021/0135797 A1* 5/2021 Yang ..................... H04L 1/1893
(Continued)

FOREIGN PATENT DOCUMENTS

CN 108886447 A 11/2018
CN 109565849 A 4/2019
CN 111756488 A 10/2020

OTHER PUBLICATIONS

International Search Report and Written Opinion dated Sep. 1, 2021 in International Application No. PCT/CN2020/132965. English translation attached.

(Continued)

*Primary Examiner* — Faruk Hamza
*Assistant Examiner* — Tito Q Pham
(74) *Attorney, Agent, or Firm* — Sheppard, Mullin, Richter & Hampton LLP

(57) ABSTRACT

Embodiments of the present disclosure provide a wireless communication method, a terminal device, and a network device. The terminal device can improve channel access efficiency on the shared spectrum. The wireless communication method includes: receiving, by a terminal device, first DCI transmitted by a network device, where the first DCI is used to schedule a sidelink transmission of the terminal device, or the first DCI is used to activate a sidelink CG or SPS configuration of the terminal device, or the first DCI is used to deactivate a sidelink CG or SPS configuration of the terminal device, the first DCI corresponding to first feedback information that is transmitted via a first uplink channel on a shared spectrum; and determining, by the terminal device, a channel access parameter corresponding to the first uplink channel according to first indication information and/or a predetermined rule.

20 Claims, 3 Drawing Sheets

200

Terminal Device

Network Device

S210. The network device transmits first DCI to a terminal device, the first DCI being used to schedule a sidelink transmission of the terminal device, or the first DCI being used to activate a sidelink CG or SPS configuration of the terminal device, or the first DCI being used to deactivate a sidelink CG or SPS configuration of the terminal device, the first DCI corresponding to first feedback information that is transmitted via a first uplink channel on a shared spectrum.

S220. The terminal device receives the first DCI.

S230. The terminal device determines a channel access parameter corresponding to the first uplink channel according to first indication information and/or a predetermined rule.

(56)          References Cited

U.S. PATENT DOCUMENTS

| | | | | |
|---|---|---|---|---|
| 2021/0194740 | A1* | 6/2021 | Aldana | H04W 16/14 |
| 2022/0103300 | A1* | 3/2022 | Sun | H04W 72/23 |
| 2022/0272673 | A1* | 8/2022 | Yang | H04L 5/0055 |
| 2022/0394704 | A1* | 12/2022 | Zhao | H04W 72/569 |
| 2022/0416950 | A1* | 12/2022 | Xu | H04L 1/189 |
| 2023/0102454 | A1* | 3/2023 | Yoshioka | H04W 72/25 |
| | | | | 370/329 |
| 2023/0319885 | A1* | 10/2023 | Bagheri | H04L 1/189 |
| | | | | 370/329 |
| 2024/0032035 | A1* | 1/2024 | Yoshioka | H04W 72/04 |

OTHER PUBLICATIONS

Qualcomm Incorporated. "Channel access Procedures for NR Unlicensed", 3GPP TSG RAN WG1 Meeting #99 R1-1912938, Nov. 22, 2019 (Nov. 22, 2019), section 2.

3rd Generation Partnership Project; Technical Specification Group Radio Access Network; NR; Multiplexing and channel coding(Release 16), 3GPP TS 38.212 V16.3.0, Sep. 2020 (Sep. 2020), section 7.3.1.2 DCI formats for scheduling of PDSCH and 7.3.1.4 DCI formats for scheduling of sidelink.

Extended European Search Report dated Dec. 4, 2023 received in European Patent Application No. EP20963121.7.

"3rd Generation Partnership Project;Technical Specification Group Radio Access Network; NR; Physical layer procedures for control (Release 16)" 3GPP Standard; Technical Specification,3GPP TS 38.213, 3rd Generation Partnership Project (3GPP), Mobile Competence Centre 650, Route Des Lucioles ; F-06921,Sophia-Antipolis Cedex : France, vol. RAN WG1, No. V16.3.0, Oct. 2, 2020 (Oct. 2, 2020), pp. 1-179, XP051961308.

Interdigital et al, "Channel access in NR-U" 3GPP Draft; R1-1912696, 3rd Generation Partnership Project (3GPP), Mobile Competence Centre : 650, Route Des Lucioles ; F-06921 Sophia-Antipolis Cedex :France, vol. RAN WG1, No. Reno, USA; Nov. 18, 2019-Nov. 22, 2019, Nov. 8, 2019 (Nov. 8, 2019), XP051820159.

* cited by examiner

<u>100</u>

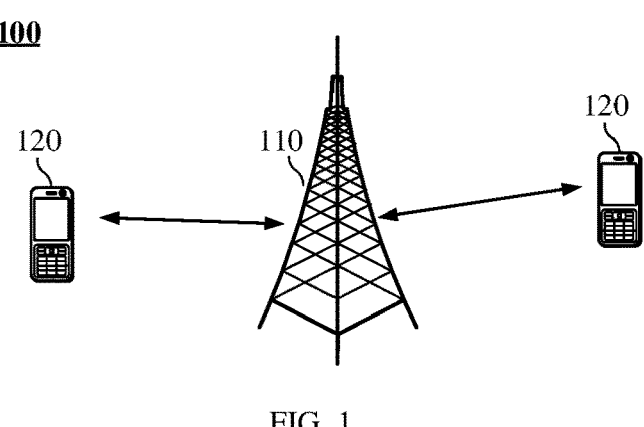

| Terminal Device | | Network Device |
|---|---|---|

S210. The network device transmits first DCI to a terminal device, the first DCI being used to schedule a sidelink transmission of the terminal device, or the first DCI being used to activate a sidelink CG or SPS configuration of the terminal device, or the first DCI being used to deactivate a sidelink CG or SPS configuration of the terminal device, the first DCI corresponding to first feedback information that is transmitted via a first uplink channel on a shared spectrum.

S220. The terminal device receives the first DCI.

S230. The terminal device determines a channel access parameter corresponding to the first uplink channel according to first indication information and/or a predetermined rule.

FIG. 2

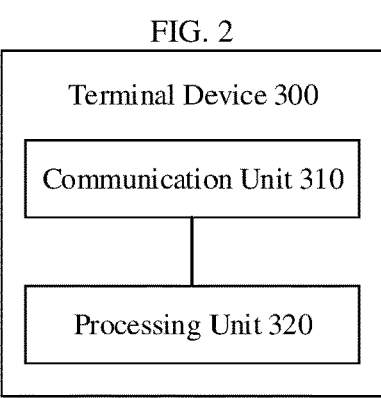

Terminal Device 300

Communication Unit 310

Processing Unit 320

FIG. 3

METHOD FOR DETERMINING CHANNEL ACCESS PARAMETER, TERMINAL DEVICE, AND NETWORK DEVICE

CROSS-REFERENCE TO RELATED APPLICATION

This application is a continuation of International Application No. PCT/CN2020/132965 filed on Nov. 30, 2020, the entire disclosure of which is incorporated herein by reference.

TECHNICAL FIELD

The embodiments of the present disclosure relate to communication technology, and more particularly, to a wireless communication method, a terminal device and a network device.

BACKGROUND

In a New Radio (NR) system, a network device can dynamically allocate resources for Sidelink (SL) transmission to a terminal device via Downlink Control Information (DCI). If the network device allocates resources for sidelink transmission to the terminal device via DCI on the shared spectrum, and/or if the terminal device feeds back Hybrid Automatic Repeat reQuest Acknowledgment (HARQ-ACK) information corresponding to the sidelink to the network device on the shared spectrum, since the transmission by the terminal device on the shared spectrum requires channel sensing and the terminal device needs to determine the corresponding channel access parameter for transmitting the HARQ-ACK information, in this case, how can the terminal device determine the corresponding channel access parameter for transmitting the HARQ-ACK information is a problem to be solved.

SUMMARY

Embodiments of the present disclosure provide a wireless communication method, a terminal device, and a network device, such that the terminal device can determine a corresponding channel access parameter for transmitting feedback information on a shared spectrum, thereby improving channel access efficiency on the shared spectrum.

In a first aspect, a wireless communication method is provided. The method includes:

receiving, by a terminal device, first Downlink Control Information (DCI) transmitted by a network device, where the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and determining, by the terminal device, a channel access parameter corresponding to the first uplink channel according to first indication information and/or a predetermined rule.

In a second aspect, a wireless communication method is provided. The method includes:

transmitting, by a network device, first Downlink Control Information (DCI) and first indication information to a terminal device, where the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and the first indication information is used to determine a channel access parameter corresponding to the first uplink channel.

In a third aspect, a terminal device is provided. The terminal device is configured to perform the method according to the above first aspect.

In particular, the terminal device includes one or more functional modules configured to perform the method according to the above first aspect.

In a fourth aspect, a network device is provided. The network device is configured to perform the method according to the above second aspect.

In particular, the network device includes one or more functional modules configured to perform the method according to the above second aspect.

In a fifth aspect, a terminal device is provided. The terminal device includes a processor and a memory. The memory has a computer program stored thereon, and the processor is configured to invoke and execute the computer program stored in the memory to perform the method according to the above first aspect.

In a sixth aspect, a network device is provided. The network device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to any of the above first and second aspects.

In particular, the apparatus includes a processor configured to invoke and execute a computer program from a memory, to cause a device provided with the apparatus to perform the method according to any of the above first and second aspects.

In an eighth aspect, a computer-readable storage medium is provided. The computer-readable storage medium stores a computer program that causes a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, the first DCI is used to schedule the sidelink transmission of the terminal device, or the first DCI is used to activate the sidelink CG or SPS configuration of the terminal device, or the first DCI is used to deactivate the sidelink CG or SPS configuration of the terminal device, and the terminal device can determine the channel access parameter corresponding to the first uplink channel carrying the first feedback information corresponding to the first DCI based on the first indication information and/or the predetermined rule, so as to improve the channel access efficiency on the shared spectrum and ensure the fairness of channel access on the shared spectrum.

BRIEF DESCRIPTION OF THE DRAWINGS

FIG. 1 is a schematic diagram showing a communication system architecture according to an embodiment of the present disclosure.

FIG. 2 is a schematic flowchart illustrating a wireless communication method according to an embodiment of the present disclosure.

FIG. 3 is a schematic block diagram of a terminal device according to an embodiment of the present disclosure.

DETAILED DESCRIPTION

Figure 4:
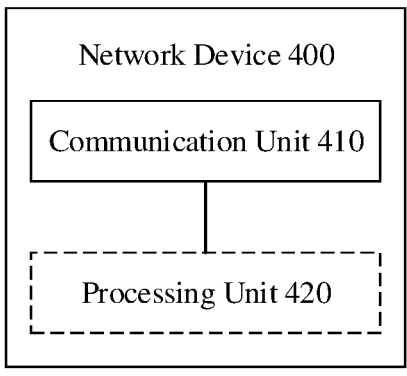
FIG. 4 is a schematic block diagram of a network device according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5$^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are only used to explain specific embodiments of the present disclosure, and are not intended to limit the present disclosure. The terms "first", "second", "third", and "fourth" in the description, claims and drawings of the present disclosure are used to distinguish different objects from each other, rather than to describe a specific order. Furthermore, the terms "include" and "have", as well as any variants thereof, are intended to cover a non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefinition" or "predetermined rule" can be achieved by pre-saving corresponding codes, tables or other means that can be used to indicate relevant information in devices (for example, including terminal devices and network devices). The present disclosure is not limited to any of these specific implementations. For example, "predefinition" or "predetermined rule" may refer to definition in a protocol.

In the embodiments of the present disclosure, the term "protocol" may refer to a standard protocol in the field of communication. For example, it may include the LTE protocol, the NR protocol, and any other related protocols applied to future communication systems, and the present disclosure is not limited to any of these examples.

In order to facilitate better understanding of the embodiments of the present disclosure, the shared spectrum as used in the present disclosure will be explained.

The shared spectrum, or unlicensed spectrum, is the spectrum allocated by the country and region that can be used for radio device communication. Communication devices in different communication systems can use this spectrum as long as they meet regulatory requirements set by the country or region on the spectrum, without having to apply for exclusive spectrum authorization from the government.

In order to allow various communication systems that use the unlicensed spectrum for wireless communication to coexist friendly on this spectrum, some countries or regions have specified regulatory requirements that must be met when using the unlicensed spectrum. For example, the communication device follows the principle of "Listen Before Talk (LBT)", that is, before the communication device transmits a signal on a channel on the unlicensed spectrum, it needs to perform channel listening first. Only when the channel sensing result shows that the channel is idle, the communication device can transmit the signal. If the channel sensing result of the communication device on the channel of the unlicensed spectrum shows that the channel is busy, the communication device cannot transmit the signal. In order to ensure fairness, in one transmission, the time length for the communication device to perform signal transmission using the channel on the unlicensed spectrum cannot exceed Maximum Channel Occupancy Time (MCOT).

Some basic concepts in transmission on the shared spectrum:

Maximum Channel Occupancy Time (MCOT): the maximum length of time that a channel is allowed for signal transmission after successful channel sensing of the channel on a shared spectrum.

Channel Occupancy Time (COT): the length of time a channel can be used for signal transmission after successful channel sensing of the channel on a shared spectrum. It can also be considered as the length of time the channel can be occupied after successful channel sensing of the channel on the shared spectrum. Here, the channel occupied by the signal within the time length may be continuous or discontinuous, and the time length includes total time for signal transmission by the device initiating the channel occupancy and the device sharing the channel occupancy.

Channel Occupancy Time of network device (gNB/eNB-initiated COT): also known as COT initiated by network device, channel occupancy time obtained by a network device after successful channel sensing of a channel on a shared spectrum. The COT initiated by the network device can not only be used by the network device for transmission, but can also be used by the terminal device for transmission under certain conditions. The COT of network device being used by the terminal device for transmission is also referred to as the terminal device sharing the COT for transmission.

Channel Occupancy Time of terminal device (UE-initiated COT): also known as COT initiated by terminal device, channel occupancy time obtained by a terminal device after successful channel sensing of a channel on a shared spectrum. The COT initiated by the terminal device can not only be used by the terminal device for transmission, but can also be used by the network device for transmission under certain conditions.

Downlink Transmission Burst (Downlink Transmission Burst): a set of downlink transmissions performed by a network device (that is, including one or more downlink transmissions). The set of downlink transmissions is continuous transmissions (that is, there is no gap between the downlink transmissions), or there are gaps in between the downlink transmissions in the set but the gaps are smaller than or equal to 16 μs. If the gap between two downlink transmissions by the network device is greater than 16 μs, then the two downlink transmissions are considered as belonging to two downlink transmission bursts.

Uplink Transmission Burst (Uplink Transmission Burst): a set of uplink transmissions performed by a terminal device (that is, including one or more uplink transmissions). The set of uplink transmissions is continuous transmissions (that is, there is no gap between the uplink transmissions), or there are gaps in between the uplink transmissions in the set but the gaps are smaller than or equal to 16 μs. If the gap between two uplink transmissions by the terminal device is greater than 16 μs, then the two uplink transmissions are considered as belonging to two uplink transmission bursts.

Channel sensing success: also known as channel sensing idle. For example, the energy detection performed on a channel in a detection time slot is lower than an energy detection threshold.

Channel sensing failure: also known as channel sensing busy. For example, the energy detection performed on a channel in a detection time slot is higher than or equal to an energy detection threshold.

In order to facilitate better understanding of the embodiments of the present disclosure, the HARQ-ACK feedback in the sidelink system related to the present disclosure will be described.

In the NR system, a network device can dynamically allocate resources for Sidelink (SL) transmission to the terminal device via DCI. After performing sidelink transmission on the resource, the terminal device needs to feed back a result of the sidelink transmission to the network device, i.e., HARQ-ACK information corresponding to the sidelink transmission. Optionally, the HARQ-ACK information provided by the terminal device includes an Acknowledgment (ACK) or a Negative Acknowledgment (NACK), or the HARQ-ACK information provided by the terminal device only includes an NACK.

The network device can schedule an NR Physical Sidelink Control Channel (PSCCH) and an NR Physical Sidelink Shared Channel (PSSCH) via DCI format 3_0. Here, DCI format 3_0 includes PUCCH resource determination information such as a Physical Sidelink Feedback Channel (PSFCH) to Hybrid Automatic Repeat reQuest (HARQ) (PSFCH-to-HARQ) feedback timing indicator and a Physical Uplink Control Channel (PUCCH) resource indicator, for determining the PUCCH resource used when the terminal device feeds back the HARQ-ACK information corresponding to the sidelink to the network device.

The network device can schedule an LTE Physical Sidelink Control Channel (PSCCH) and an LTE Physical Sidelink Shared Channel (PSSCH) via DCI format 3_1.

When the network device dynamically or semi-statically allocates resources for sidelink transmission to the terminal device via DCI on the shared spectrum, and/or when the terminal device feeds back the HARQ-ACK information corresponding to the sidelink to the network device on the shared spectrum, since the transmission by the terminal device on the shared spectrum requires channel sensing, the terminal device needs to determine the corresponding channel access process and Cyclic Prefix Extension (CPE) length when transmitting the HARQ-ACK information.

In view of the above problems, the present disclosure proposes a method for determining a channel access process. The terminal device can determine a corresponding channel access parameter when transmitting feedback information on a shared spectrum, thereby improving the channel access efficiency on the shared spectrum and ensuring fair usage of the shared spectrum.

The technical solutions of the present disclosure will be described in detail below with reference to specific examples.

FIG. 2 is a schematic flowchart illustrating a wireless communication method 200 according to an embodiment of the present disclosure. As shown in FIG. 2, the method 200 may include at least part of the following content:

At S210, a network device transmits first DCI to a terminal device. The first DCI is used to schedule a sidelink transmission of the terminal device, or the first DCI is used to activate a sidelink CG or SPS configuration of the terminal device, or the first DCI is used to deactivate a sidelink CG or SPS configuration of the terminal device. The first DCI corresponds to first feedback information that is transmitted via a first uplink channel on a shared spectrum.

At S220, the terminal device receives the first DCI.

At S230, the terminal device determines a channel access parameter corresponding to the first uplink channel according to first indication information and/or a predetermined rule.

It should be noted that, in an embodiment of the present disclosure, the "predetermined rule" may be information agreed in a protocol. That is, the terminal device may determine the channel access parameter corresponding to the first uplink channel according to the information agreed in the protocol.

In addition, in an embodiment of the present disclosure, the "shared spectrum" may also be referred to as an "unlicensed band", and the present disclosure is not limited to this.

Optionally, the above S210 may be, for example, the network device transmitting the first DCI to the terminal device on the shared spectrum.

Optionally, the first DCI being used to schedule the sidelink transmission of the terminal device may include:

the first DCI being used to schedule at least one of a PSCCH or a PSSCH of the terminal device.

Optionally, the first DCI is used to schedule the sidelink transmission of the terminal device, and the sidelink scheduled by the first DCI may be transmitted on a non-shared spectrum, or in other words, the sidelink scheduled by the first DCI may be transmitted over a licensed spectrum.

Optionally, the first DCI is used to schedule the sidelink transmission of the terminal device, and the sidelink scheduled by the first DCI may be transmitted on a shared spectrum, or in other words, the sidelink scheduled by the first DCI may be transmitted over an unlicensed spectrum.

Optionally, when the first DCI is used to schedule the sidelink transmission of the terminal device, the first DCI may correspond to the first feedback information, and the first feedback information may include feedback information corresponding to the sidelink transmission of the terminal device scheduled by the first DCI.

For example, the first DCI may be used to schedule a PSSCH of the terminal device, and if the PSSCH transmission of the terminal device succeeds, the first feedback information includes an ACK, and if the PSSCH transmission of the terminal device fails, the first feedback information includes an NACK.

In another example, the first DCI may be used to schedule a PSSCH of the terminal device, and if the PSSCH transmission of the terminal device succeeds, the terminal device generates no feedback information, and if the PSSCH transmission of the terminal device fails, the first feedback information includes an NACK.

In another example, the first DCI may be used to schedule the terminal device to transmit a first PSCCH and a first PSSCH, the first PSSCH transmission corresponds to a first PSFCH, and the first feedback information corresponds to a reception status of the first PSFCH.

Optionally, when the first DCI is used to activate the sidelink CG or SPS configuration of the terminal device, the first DCI may correspond to the first feedback information, and the first feedback information may include corresponding feedback information when the first DCI activates the sidelink CG or SPS configuration of the terminal device.

For example, the first DCI is used to activate the sidelink CG configuration of the terminal device, and if the terminal device receives the first DCI, the first feedback information includes an ACK.

In another example, the first DCI is used to activate the sidelink CG configuration of the terminal device, and if the first DCI activates the sidelink CG configuration of the terminal device successfully, the first feedback information includes an ACK; and if the first DCI fails to activate the sidelink CG configuration of the terminal device, the first feedback information includes an NACK.

In another example, the first DCI is used to activate the sidelink SPS configuration of the terminal device, and if the terminal device receives the first DCI, the first feedback information includes an ACK.

In another example, the first DCI is used to activate the sidelink SPS configuration of the terminal device, and if the first DCI activates the sidelink SPS configuration of the terminal device successfully, the first feedback information includes an ACK; and if the first DCI fails to activate the sidelink SPS configuration of the terminal device, the first feedback information includes an NACK.

Optionally, when the first DCI is used to deactivate the sidelink CG or SPS configuration of the terminal device, the first DCI may correspond to the first feedback information, and the first feedback information may include corresponding feedback information when the first DCI deactivates the sidelink CG or SPS configuration of the terminal device.

For example, the first DCI is used to deactivate the sidelink CG configuration of the terminal device, and if the terminal device receives the first DCI, the first feedback information includes an ACK.

In another example, the first DCI is used to deactivate the sidelink CG configuration of the terminal device, and if the first DCI deactivates the sidelink CG configuration of the terminal device successfully, the first feedback information includes an ACK; and if the first DCI fails to deactivate the sidelink CG configuration of the terminal device, the first feedback information includes an NACK.

In another example, the first DCI is used to deactivate the sidelink SPS configuration of the terminal device, and if the terminal device receives the first DCI, the first feedback information includes an ACK.

In another example, the first DCI is used to deactivate the sidelink SPS configuration of the terminal device, and if the first DCI deactivates the sidelink SPS configuration of the terminal device successfully, the first feedback information includes an ACK; and if the first DCI fails to deactivate the sidelink SPS configuration of the terminal device, the first feedback information includes an NACK.

Optionally, the sidelink CG or SPS configuration of the terminal device may be a sidelink CG or SPS configuration on a licensed spectrum, or in other words, the sidelink CG or SPS configuration of the terminal device may be sidelink CG or SPS configuration on an unshared spectrum.

Optionally, the sidelink CG or SPS configuration of the terminal device may be a sidelink CG or SPS configuration on an unlicensed spectrum, or in other words, the sidelink CG or SPS configuration of the terminal device may be a sidelink CG or SPS configuration on a shared spectrum.

Optionally, the first uplink channel may include a Physical Uplink Control Channel (PUCCH) or a Physical Uplink Shared Channel (PUSCH).

Optionally, the first DCI may correspond to a first DCI format, and the first DCI format may include at least one of DCI format 3_0 or DCI format 3_1. Alternatively, the first DCI format may be another DCI format used to schedule the sidelink transmission of the terminal device, or to activate the CG or SPS configuration of the terminal device, or to deactivate the sidelink CG or SPS configuration of the terminal device.

Optionally, in an embodiment of the present disclosure, the channel access parameter corresponding to the first uplink channel may include at least one of: a channel access type, a CPE length, a Channel Access Priority Class (CAPC) or a channel access process.

Optionally, in an LBE scenario, the channel access parameter corresponding to the first uplink channel may include at least one of: a channel access type, a CPE length, or a CAPC.

Optionally, in an FBE scenario, the channel access parameter corresponding to the first uplink channel may include at least one of a channel access type, a CPE length, or a channel access process.

Optionally, in some embodiments, the first indication information may be carried in the first DCI.

For example, the network device may transmit the first DCI to the terminal device, and the first DCI may include the first indication information.

Optionally, in some embodiments, the first indication information is transmitted by the network device via Radio Resource Control (RRC) signaling or Media Access Control Control Element (MAC CE) signaling.

For example, the network device transmits the first DCI to the terminal device, and transmits the first indication information to the terminal device via RRC signaling or MAC CE signaling.

Optionally, in some embodiments, the first uplink channel may be a first PUSCH, and the first indication information may be carried in second DCI for scheduling transmission of the first PUSCH. The first DCI may correspond to the first PUCCH, and the first PUSCH and the first PUCCH may at least partially overlap in the time domain.

For example, the network device may transmit the first DCI and the second DCI to the terminal device, the second DCI may include the first indication information. The first uplink channel may be the first PUSCH, the second DCI may be used for scheduling transmission of the first PUSCH, the first DCI may correspond to the first PUCCH, and the first PUSCH and the first PUCCH may at least partially overlap in time domain.

Optionally, the first DCI corresponding to the first PUCCH may include: the first feedback information corresponding to the first DCI being transmitted via the first PUCCH. For example, the first DCI may include time domain position indication information and/or PUCCH resource indication information for the first PUCCH.

Optionally, in some embodiments, the first uplink channel may be a first PUCCH, and the first DCI may include time domain position indication information and/or PUCCH resource indication information for the first PUCCH.

Optionally, in some embodiments, S230 may include at least one of:

the predetermined rule predefining that the first uplink channel corresponds to a first channel access type, and when the first indication information indicates that the first uplink channel corresponds to a second channel access type, the terminal device determining that the first uplink channel corresponds to the second channel access type;

the terminal device determining a channel access type corresponding to the first uplink channel according to the first indication information;

the predetermined rule predefining that the first uplink channel corresponds to the first channel access type, and the terminal device determining that the first uplink channel corresponds to the first channel access type;

the predetermined rule predefining that the first uplink channel corresponds to a first channel access process, and when the first indication information indicates that the first uplink channel corresponds to a second channel access process, the terminal device determining that the first uplink channel corresponds to the second channel access process;

the terminal device determining a channel access process corresponding to the first uplink channel according to the first indication information; or the predetermined rule predefining that the first uplink channel corresponds to the first channel access process, and the terminal device determining that the first uplink channel corresponds to the first channel access process.

It should be noted that, in FBE, the first indication information may not directly indicate a channel access process; or the first indication information may indicate a channel access process. The present disclosure is not limited to any of these examples.

Optionally, the first channel access process and the second channel access process may include at least one of:

the first channel access process including a channel access process sharing Channel Occupancy Time (COT) channel sensing, and the second channel access process including a channel access process without channel sensing;

the first channel access process including a channel access process without channel sensing, and the second channel access process including a channel access process sharing COT channel sensing;

the first channel access process including a channel access process initiating COT channel sensing, and the second channel access process including one of a channel access process sharing COT channel sensing or a channel access process without channel sensing;

the first channel access process including one of a channel access process sharing COT channel sensing or a channel access process without channel sensing, and the second channel access process including a channel access process initiating COT channel sensing; or the first channel access process including a channel access process without channel sensing, and the second channel access process including one of a channel access process sharing COT channel sensing or a channel access process initiating COT channel sensing.

Optionally, the channel access process corresponding to the first uplink channel may include one of a channel access process initiating COT channel sensing, a channel access process sharing COT channel sensing, or a channel access process without channel sensing.

Optionally, the first channel access type may include Type 1 channel access, and the second channel access type may include one of Type 2A channel access, Type 2B channel access, or Type 2C channel access.

Optionally, the channel access type indicated by the first indication information may include one of Type 1 channel access, Type 2A channel access, Type 2B channel access, or Type 2C channel access.

Optionally, for the network device, the first indication information may be used to determine the channel access parameter corresponding to the first uplink channel. The first indication information being used to determine the channel access parameter corresponding to the first uplink channel may include at least one of:

when the first indication information indicates that the first uplink channel corresponds to a second channel access type, the terminal device determining that the first uplink channel corresponds to the second channel access type;

the terminal device determining a channel access type corresponding to the first uplink channel according to the first indication information;

when the first indication information indicates that the first uplink channel corresponds to a second channel access process, the terminal device determining that the first uplink channel corresponds to the second channel access process; or the terminal device determining a channel access process corresponding to the first uplink channel according to the first indication information.

Optionally, the second channel access type may include one of Type 2A channel access, Type 2B channel access, or Type 2C channel access.

Optionally, the second channel access process may include at least one of:

the second channel access process including a channel access process without channel sensing;

the second channel access process including a channel access process sharing Channel Occupancy Time (COT) channel sensing;

the second channel access process including one of a channel access process sharing COT channel sensing or a channel access process without channel sensing; or the second channel access process including a channel access process initiating COT channel sensing.

Optionally, in a system based on the FBE mode, the channel access process corresponding to the first uplink channel may include a channel access process initiating COT channel sensing, or the channel access process corresponding to the first uplink channel may be a channel access process initiating COT channel sensing, when the following conditions are met: the start position of the first uplink channel is aligned with the boundary of the FFP configured for the terminal device, the FFP configured for the terminal device being an FFP that can be used for the terminal device to initiate COT.

Optionally, when the channel access process corresponding to the first uplink channel is a channel access process initiating COT channel sensing, the terminal device may determine that the CPE length corresponding to the first uplink channel is 0. For example, when the channel access process corresponding to the first uplink channel is a channel access process initiating COT channel sensing, the terminal device may determine the CPE length corresponding to the first uplink channel as 0, regardless of whether the value of the CPE length indicated by the first indication information is 0 or not.

It should be noted that on the shared spectrum, a communication device needs to perform LBT (also called channel sensing) before transmitting a channel or signal. Only when the LBT is successful, the transmission can be performed, and in case of LBT failure, no transmission can be performed. Therefore, the communication on the shared spectrum is opportunistic transmission. From the perspective of system network deployment, channel sensing includes two mechanisms, one is LBT for Load Based Equipment (LBE), also known as dynamic channel sensing, dynamic channel access, or dynamic channel occupancy, and the other is LBT for Frame Based Equipment (FBE), also known as semi-static channel sensing, semi-static channel access or semi-static channel occupancy.

In the channel access mechanism of LBE, or in other words, the dynamic channel access mode, a variety of different channel access schemes may be used, including e.g., Type 1 channel access, Type 2A channel access, Type 2B channel access, and Type 2C channel access.

Type 1 Channel Access:

The channel sensing mode of the communication device is multi-slot channel sensing based on random backoff with contention window size adjustment. Specifically, in Type 1 channel access, different CAPCs may be included according to priorities of transmission traffic. For example, Table 1 is an example of channel access parameters corresponding to different CAPCs. Here, the smaller the value of p is, the higher the CAPC will be. Optionally, Table 1 is used for Type 1 channel access for uplink transmission of the terminal device.

TABLE 1

| CAPC (p) | $m_p$ | $CW_{min,p}$ | $CW_{max,p}$ | $T_{mcot,p}$ | Allowed $CW_p$ value |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It should be noted that in the above Table 1, $m_p$ denotes the number of backoff slots corresponding to the CAPC p, $CW_p$ denotes the contention window size corresponding to the CAPC p, $CW_{min,p}$ denotes the minimum value of $CW_p$ corresponding to the CAPC p, $CW_{max,p}$ denotes the maximum value of $CW_p$ corresponding to the CAPC p, and $T_{mcot,p}$ denotes the maximum channel occupancy time length corresponding to the CAPC p.

Type 2A Channel Access:

The channel sensing mode of the communication device is channel sensing with a fixed time slot length of 25 microseconds. Specifically, in Type 2A channel access, the communication device can perform channel sensing for 25 microseconds before transmission starts, and perform transmission after the channel sensing succeeds.

Type 2B Channel Access:

The channel sensing mode of the communication device is channel sensing with a fixed time slot length of 16 microseconds. Specifically, in Type 2B channel access, the communication device can perform channel sensing for 16 microseconds before transmission starts, and perform transmission after the channel sensing succeeds. Optionally, the gap between the start position of the transmission and the end position of the previous transmission is 16 microseconds.

Type 2C Channel Access:

The communication device transmits without channel sensing after the gap ends. Specifically, in Type 2C channel access, the communication device can directly transmit, with the gap between the start position of the transmission and the end position of the previous transmission being smaller than or equal to 16 microseconds. Optionally, the length of the transmission does not exceed 584 microseconds.

In the FBE channel access mechanism, or the semi-static channel access mode, when the terminal device is scheduled to perform uplink transmission within a Fixed Frame Period (FFP) of the base station, the terminal device can share the base station's COT for transmission. After the terminal device detects the downlink transmission burst transmitted by the base station in the COT, the terminal device can share resources in the COT of the base station for uplink transmission. In this case, the channel sensing mode of the terminal device may include:

No channel sensing (as an example, if the gap between the uplink transmission burst and the downlink transmission burst does not exceed 16 microseconds, the terminal device may start transmitting the uplink transmission burst without performing channel sensing after the downlink transmission burst ends); and Channel sensing by sharing COT (as an example, if the gap between the uplink transmission burst and the downlink transmission burst exceeds 16 microseconds, the terminal device performs channel sensing with a sensing slot length of 9 microseconds in the interval of a length of 25 microseconds before the start of the uplink transmission burst, and transmits the uplink transmission burst after the channel sensing succeeds).

Alternatively, when the start position of the uplink transmission of the terminal device is aligned with the boundary of the FFP configured for the terminal device, the terminal device may perform channel sensing by initiating an FFP or initiating COT. In this case, the channel sensing mode of the terminal device may include: channel sensing by initiating the COT. As an example, the terminal device performs channel sensing with a sensing slot length of 9 microseconds before the FFP starts, and transmits the uplink transmission burst after the channel sensing succeeds.

Optionally, in some embodiments, S230 may include:

determining, by the terminal device, a CPE length corresponding to the first uplink channel according to the first indication information; or determining, by the terminal device, the CPE length corresponding to the first uplink channel as 0.

For example, the first uplink channel may be a first PUCCH. If the CPE length indicated by the first indication information received by the terminal device is not 0, then the first symbol of the first PUCCH transmitted by the terminal device after the channel access succeeds corresponds to a CPE, and the length of the CPE is determined according to the indicated CPE length. If the CPE length indicated by the first indication information received by the terminal device is 0, then the first symbol of the first PUCCH transmitted by the terminal device after the channel access succeeds does not correspond to a CPE.

In another example, the terminal device determines the CPE length corresponding to the first uplink channel as 0. Assuming that the first uplink channel is a first PUCCH, the first symbol of the first PUCCH transmitted by the terminal device after the channel access succeeds does not correspond to a CPE.

In some embodiments, the first indication information may indicate a channel access type and/or a CPE length.

Optionally, the first indication information may be channel access indication information indicating a channel access type and a CPE length that are jointly coded from a channel access parameter set.

Here, the channel access parameter set is a predetermined channel access parameter set; or the channel access parameter set is a channel access parameter set configured by the network device.

For example, when the terminal device is scheduled to transmit a PUCCH, the network device may indicate the channel access mode corresponding to the PUCCH and the CPE length during transmission of the terminal device via the channel access indication information in the first DCI.

For example, the first DCI format may include channel access indication information indicating channel access type and CPE length that are jointly coded from a first indication set (that is, the channel access parameter set);

The first indication set may be predetermined, as shown in Table 2 below. Here, the CPE length indicated by the first indication information may be determined according to Table 2 and Table 3.

The channel access type and CPE length can be used for PUCCH transmission. The PUCCH can carry the first feedback information. Optionally, CAPC=1.

The channel access indication information includes 2 bits (or in other words, the first indication information includes 2 bits).

In another example, the first DCI format may include channel access indication information indicating the channel access type and CPE length that are jointly coded from a second indication set (that is, the channel access parameter set).

The second indication set may be configured by a higher layer parameter, and the second indication set may include at least one row indicating the jointly coded channel access type and CPE length. Here, the CPE length indicated by the first indication information is determined according to the second indication set and Table 3.

The channel access type and CPE length can be used for PUCCH transmission. The PUCCH can carry the first feedback information. Optionally, CAPC=1.

The channel access indication information includes up to 4 bits. Specifically, the number of bits included in the channel access indication information is determined according to the size of the second indication set configured by the higher-layer parameter, e.g., the number of rows included in the second indication set (or in other words, the number of bits included in the first indication information is configurable).

TABLE 2

| First Instruction Set | | |
|---|---|---|
| Channel Access Indication Information | Channel Access Type | CPE Length Indication |
| 0 | Type 2C Channel Access | 2 |
| 1 | Type 2A Channel Access | 3 |
| 2 | Type 2A Channel Access | 1 |
| 3 | Type 1 Channel Access | 0 |

TABLE 3

| CPE Parameters | | |
|---|---|---|
| CPE length indication | Ci | Δi |
| 0 | — | — |
| 1 | C1 | 25 microseconds |
| 2 | C2 | 16 microseconds + $T_{TA}$ |
| 3 | C3 | 25 microseconds + $T_{TA}$ |

Here, the values of C2 and C3 are configured by higher layer parameters, and the value of C1 is predetermined. When $\mu \in \{0,1\}$, C1=1, and when $\mu$=2, C1=2. Here, $\mu$ represents the subcarrier spacing configuration, and $\mu$=0, 1, and 2 represent 15 kHz, 30 kHz, and 60 kHz, respectively.

As shown in Table 2 above, if the channel access indication information indicates 0, the channel access type is Type 2C, and the CPE length is determined according to the CPE length corresponding to 2 in Table 3, that is, the CPE length is determined according to C2 and 16 microseconds+$T_{TA}$. Optionally, the determination of the CPE length according to Table 3 includes: CPE length=Ci*symbol length-Δi. As an example, in this case the CPE length is C2*symbol length-16 microseconds-$T_{TA}$.

Optionally, in a system based on the FBE mode, if the terminal device receives an indication of Type 2A channel access or Type 1 channel access, the channel sensing mode of the terminal device is channel sensing by sharing COT. If the terminal device receives an indication of Type 2C channel access, the channel sensing mode of the terminal device is no channel sensing.

Optionally, in some embodiments, when the terminal device determines that the channel access type corresponding to the first uplink channel is Type 1 channel access, S230 may include:

determining, by the terminal device when the first uplink channel is a first Physical Uplink Control Channel (PUCCH), a CAPC corresponding to the first uplink channel as p=1;

determining, by the terminal device when the first uplink channel is a first Physical Uplink Shared Channel (PUSCH) and the first PUSCH includes no user data, the CAPC corresponding to the first uplink channel as p=1; or determining, by the terminal device when the first uplink channel is a first PUSCH and the first PUSCH includes user data, the CAPC corresponding to the first uplink channel according to a priority of the user data.

For example, when the first uplink channel is the first PUCCH, the terminal device determines that the CAPC corresponding to the first PUCCH is CAPC p=1 according to the predetermined rule.

In another example, when the first uplink channel is the first PUSCH and the first PUSCH include no user data, the terminal device determines that the CAPC corresponding to the first PUCCH is CAPC p=1 according to the predetermined rule.

Optionally, when the first uplink channel is the first PUSCH and the first PUSCH includes user data, the terminal device may, according to the priority of the user data, determine the CAPC corresponding to the first uplink channel, as an example, according to the mapping between 5G QoS Indicators (5QIs) and CAPCs as shown in Table 4

TABLE 4

| CAPC | 5QI |
|------|-----|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

Note:
the smaller the value of CAPC, the higher the priority

Optionally, in some embodiments, the first indication information may be channel access indication information indicating a channel access type, a CPE length, and a CAPC that are jointly coded from a channel access parameter set, and when the terminal device determines that the channel access type corresponding to the first uplink channel is Type 1 channel access, S230 may include:

determining, by the terminal device, a CAPC corresponding to the first uplink channel according to the first indication information.

Optionally, in some embodiments, S230 may include:

determining, by the terminal device, the channel access parameter corresponding to the first uplink channel according to the predetermined rule, where the first DCI does not include the first indication information, and the first indication information is channel access indication information. Optionally, in this case, the network device does not transmit the first indication information to the terminal device, so the terminal device will not receive the first indication information.

Optionally, in some embodiments, the first DCI may include second indication information indicating at least one of:

an index of a scheduled group;

a New Feedback Indicator (NFI) for the scheduled group;

a number of feedback groups;

an NFI for a non-scheduled group; or a total sidelink assignment index (T-SAI) for the non-scheduled group.

It should be noted that the "scheduled group" in the content indicated by the second indication information refers to a group scheduled by the first DCI, and the "non-scheduled group" in the content indicated in the second indication information refers to a group that is not the group scheduled by the first DCI.

Optionally, if the terminal device needs to feed back the feedback information corresponding to one group, it feeds back the feedback information corresponding to the scheduled group, that is, the group scheduled by the first DCI. If the terminal device needs to feed back the feedback information corresponding to two groups, it feeds back the feedback information corresponding to the scheduled group and the non-scheduled group.

Optionally, when the terminal device is configured with an enhanced type, eType-2, codebook feedback mode, the first DCI includes the second indication information. For example, the network device configures an enhanced type, eType-2, codebook feedback mode for the terminal device, and the first DCI includes the second indication information.

Optionally, in some embodiments, the first DCI may include third indication information indicating whether to request a Type-3 codebook feedback.

Optionally, when the terminal device is configured with a Type-3 codebook feedback mode, the first DCI includes the third indication information. For example, the network device configures a Type-3 codebook feedback mode for the terminal device, and the first DCI includes the third indication information.

It should be noted that on the shared spectrum, the terminal device can be configured with an enhanced Dynamic or enhanced Type 2 or eType2 feedback mode and/or a one-shot HARQ-ACK feedback (or Type 3) codebook feedback mode.

For the enhanced dynamic codebook (enhanced Dynamic codebook, eType2 codebook) feedback, the network device can group the scheduled sidelinks, and indicate the group information of the sidelinks via explicit signaling, such that the terminal device can perform HARQ-ACK feedback corresponding to the sidelinks according to different groups. In other words, the DCI used by the network device to schedule the sidelink transmission of the terminal device, such as DCI format 3_0 or DCI format 3_1, may include indication information of a sidelink group index (such as group index), and the sidelink group indicated by the indication information is a scheduled group. In this way, there may be at most 2 groups, and the group not indicated by the indication information is a non-scheduled group. The DCI format may also include at least one of: indication information of a New Feedback Indicator (NFI) for the scheduled group, indication information of an NFI for the non-scheduled group, indication information of a total sidelink assignment index (T-SAI) for the non-scheduled group, or indication information of a number of feedback groups (for example, a number of requested sidelink group(s)).

When the network device triggers the terminal device to perform HARQ-ACK feedback, it can trigger feedback for one group, or trigger feedback for two groups at the same time. For example, if the terminal device receives the DCI transmitted by the network device, and the information field of the number of feedback groups in the DCI is a predetermined value, e.g., 1, then the terminal device needs to perform HARQ-ACK feedback for two groups. Alternatively, if the information field of the number of feedback groups in the DCI is another predetermined value, e.g., 0, then the terminal device needs to perform HARQ-ACK feedback for one group. When the terminal device performs the HARQ-ACK feedback for two groups, it needs to feed back the HARQ-ACK information of the scheduled group and the non-scheduled group. When the terminal device performs the HARQ-ACK feedback for one group, it needs to feed back the HARQ-ACK information of the scheduled group.

For one-shot HARQ-ACK feedback (also known as single-shot HARQ-ACK feedback, or Type-3 codebook feedback), the network device can configure one-shot HARQ-ACK feedback for the terminal device, and trigger the terminal device to perform one-shot HARQ-ACK feedback via DCI such as DCI format 3_0 or DCI format 3_1. As an example, the Type-3 codebook feedback includes HARQ-ACK information feedback corresponding to all HARQ processes corresponding to sidelink transmissions configured for the terminal device in a PUCCH group. If the terminal device is configured with one-shot HARQ-ACK feedback, the DCI, such as DCI format 3_0 or DCI format 3_1, may include a one-shot HARQ-ACK feedback request information field (such as One-shot HARQ-ACK Request, i.e., the third indication information). If the terminal device receives the DCI transmitted by the network device, and the one-shot HARQ-ACK feedback request information field in the DCI is a predetermined value, e.g., 1, then the terminal device needs to perform one-shot HARQ-ACK feedback.

Therefore, in an embodiment of the present disclosure, the first DCI is used to schedule the sidelink transmission of the terminal device, or the first DCI is used to activate the sidelink CG or SPS configuration of the terminal device, or the first DCI is used to deactivate the sidelink CG or SPS configuration of the terminal device, and the terminal device may determine the channel access parameter corresponding to the first uplink channel carrying the first feedback information corresponding to the first DCI according to the first indication information and/or the predetermined rule. In this way, the channel access efficiency on the shared spectrum can be improved, and the fair usage of the shared spectrum can be ensured.

The technical solutions of the present disclosure will be described in detail below with reference to Embodiment 1 to Embodiment 3.

In Embodiment 1, DCI format 3_0 or DCI format 3_1 includes first indication information indicating the channel access type and CPE length that are jointly coded from the first indication set. Here, the first indication set is predetermined, as shown in Table 2 above. The CPE length is determined according to the first indication set and the above Table 3 jointly. Here, the first indication information includes 2 bits. DCI format 3_0 or DCI format 3_1 corresponds to the first PUCCH.

In Embodiment 1, the terminal device may determine the CPE length of the first symbol in the first PUCCH according to the CPE length indicated by the first indication information.

In a system based on LBE mode, if the first indication information received by the terminal device indicates Type 2A channel access or Type 2B channel access or Type 2C channel access, the terminal device determines that the channel sensing mode corresponding to the first PUCCH is Type 2A channel access, Type 2B channel access, or Type 2C channel access.

In a system based on the LBE mode, if the first indication information received by the terminal device indicates Type 1 channel access, the terminal device determines that the CAPC corresponding to the first PUCCH is p=1.

In a system based on the FBE mode, if the first indication information received by the terminal device indicates Type 2A channel access or Type 1 channel access, the terminal device determines that the channel sensing mode corresponding to the first PUCCH is channel sensing by sharing COT. If the first indication information received by the terminal device indicates Type 2C channel access, the terminal device determines that the channel sensing mode corresponding to the first PUCCH is no channel sensing.

In Embodiment 2, DCI format 3_0 or DCI format 3_1 includes first indication information indicating the channel access type and CPE length that are jointly coded from the second indication set. Herein, the second indication set is configured by the network device according to the third indication set, and the second indication set includes at least one row in the third indication set. The third indication set is shown in Table 5 below. The CPE length is determined according to the second indication set and the above Table 3 jointly. Here, the number of bits included in the first indication information is determined according to the number of rows included in the second indication set. DCI format 3_0 or DCI format 3_1 corresponds to the first PUCCH.

It should be noted that the CPE length is determined according to the second indication set and the above Table 3 jointly, and the determination scheme has been described above, and will not be repeated here.

TABLE 5

| | Third Indication Set | |
|---|---|---|
| Row Index | Channel Access Type | CPE Length Indication |
| 0 | Type 2C Channel Access | 0 |
| 1 | Type 2C Channel Access | 2 |
| 2 | Type 2B Channel Access | 0 |
| 3 | Type 2B Channel Access | 2 |
| 4 | Type 2A Channel Access | 0 |
| 5 | Type 2A Channel Access | 1 |
| 6 | Type 2A Channel Access | 3 |
| 7 | Type 1 Channel Access | 0 |
| 8 | Type 1 Channel Access | 1 |
| 9 | Type 1 Channel Access | 2 |
| 10 | Type 1 Channel Access | 3 |

In Embodiment 2, the terminal device determines the CPE length of the first symbol in the first PUCCH according to the CPE length indicated by the first indication information.

In a system based on the LBE mode, if the terminal device receives the first indication information indicating Type 2A channel access or Type 2B channel access or Type 2C channel access, the terminal device determines that the channel sensing mode corresponding to the first PUCCH is Type 2A channel access or Type 2B channel access or Type 2C channel access.

In a system based on the LBE mode, if the first indication information indicates Type 1 channel access, the CAPC corresponding to the first PUCCH is p=1.

In a system based on FBE mode, if the terminal device receives the first indication information indicating Type 2A channel access or Type 1 channel access, the terminal device determines that the channel sensing mode corresponding to the first PUCCH is channel sensing by sharing COT. If the terminal device receives the first indication information indicating Type 2C channel access, the terminal device determines that the channel sensing mode corresponding to the first PUCCH is no channel sensing.

In a system based on the FBE mode, if the terminal device receives the first indication information indicating Type 2B channel access, the terminal device determines that the channel sensing mode corresponding to the first PUCCH is no channel sensing.

In Embodiment 3, DCI format 3_0 or DCI format 3_1 does not include first indication information. DCI format 3_0 or DCI format 3_1 corresponds to the first PUCCH.

In Embodiment 3, when the terminal device receives scheduling in DCI format 3_0 or DCI format 3_1, the terminal device determines the channel access parameter corresponding to the first PUCCH according to a predetermined rule.

Optionally, the terminal device determines that the CPE length corresponding to the first PUCCH is 0, that is, the terminal device determines that the CPE length of the first symbol in the first PUCCH is 0.

In a system based on the LBE mode, the terminal device determines that the channel sensing mode corresponding to the first PUCCH is Type 1 channel access. The terminal device determines that the CAPC corresponding to the first PUCCH is p=1.

In a system based on FBE mode, when the terminal device detects a downlink transmission burst transmitted by the base station in the first COT of the base station and transmits the first PUCCH on the resources in the first COT, if the gap between the first PUCCH and the downlink transmission burst does not exceed 16 microseconds, the terminal device determines that the channel sensing mode corresponding to the first PUCCH is no channel sensing; or if the gap between the first PUCCH and the downlink transmission burst exceeds 16 microseconds, the terminal device determines that the channel sensing mode corresponding to the first PUCCH is channel sensing by sharing COT.

In a system based on the FBE mode, when the start position of the first PUCCH is aligned with the boundary of the FFP configured for the terminal device, the terminal device determines that the channel sensing mode corresponding to the first PUCCH is channel sensing by initiating COT. Here, the FFP configured for the terminal device is an FFP that can be used for the terminal device to initiate the COT.

The method embodiments of the present disclosure have been described in detail above with reference to FIG. 2, and the apparatus embodiments of the present disclosure will be described in detail below with reference to FIG. 3 to FIG. 7. It should be understood that the apparatus embodiments and the method embodiments correspond to each other, and for similar descriptions, reference can be made to the method embodiments.

FIG. 3 shows a schematic block diagram of a terminal device 300 according to an embodiment of the present disclosure. As shown in FIG. 3, the terminal device 300 includes:

a communication unit 310 configured to receive first Downlink Control Information (DCI) transmitted by a network device, where the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and a processing unit 320 configured to determine a channel access parameter corresponding to the first uplink channel according to first indication information and/or a predetermined rule.

Optionally, the channel access parameter corresponding to the first uplink channel may include at least one of: a channel access type, a Cyclic Prefix Extension (CPE) length, a Channel Access Priority Class (CAPC), or a channel access process.

Optionally, the processing unit 320 being configured to determine the channel access parameter corresponding to the first uplink channel according to the first indication information and/or the predetermined rule may include at least one of:

the predetermined rule predefining that the first uplink channel corresponds to a first channel access type, and when the first indication information indicates that the first uplink channel corresponds to a second channel access type, the processing unit 320 being configured to determine that the first uplink channel corresponds to the second channel access type;

the processing unit 320 being configured to determine a channel access type corresponding to the first uplink channel according to the first indication information;

the predetermined rule predefining that the first uplink channel corresponds to the first channel access type, and the processing unit 320 being configured to determine that the first uplink channel corresponds to the first channel access type;

the predetermined rule predefining that the first uplink channel corresponds to a first channel access process, and when the first indication information indicates that the first uplink channel corresponds to a second channel access process, the processing unit 320 being configured to determine that the first uplink channel corresponds to the second channel access process;

the processing unit 320 being configured to determine a channel access process corresponding to the first uplink channel according to the first indication information; or the predetermined rule predefining that the first uplink channel corresponds to the first channel access process, and the processing unit 320 being configured to determine that the first uplink channel corresponds to the first channel access process.

Optionally, the first channel access type may include Type 1 channel access, and the second channel access type may include one of Type 2A channel access, Type 2B channel access, or Type 2C channel access.

Optionally, the channel access type indicated by the first indication information may include one of: Type 1 channel access, Type 2A channel access, Type 2B channel access, or Type 2C channel access.

Optionally, the first channel access process and the second channel access process may include at least one of:

the first channel access process including a channel access process sharing Channel Occupancy Time (COT) channel sensing, and the second channel access process including a channel access process without channel sensing;

the first channel access process including a channel access process without channel sensing, and the second channel access process including a channel access process sharing COT channel sensing;

the first channel access process including a channel access process initiating COT channel sensing, and the second channel access process including one of a channel access process sharing COT channel sensing or a channel access process without channel sensing;

the first channel access process including one of a channel access process sharing COT channel sensing or a channel access process without channel sensing, and the second channel access process including a channel access process initiating COT channel sensing; or the first channel access process including a channel access process without channel sensing, and the second channel access process including one of a channel access process sharing COT channel sensing or a channel access process initiating COT channel sensing.

Optionally, the channel access process corresponding to the first uplink channel may include one of a channel access process initiating COT channel sensing, a channel access process sharing COT channel sensing, or a channel access process without channel sensing.

Optionally, the processing unit 320 may be configured to:

determine a CPE length corresponding to the first uplink channel according to the first indication information; or determine the CPE length corresponding to the first uplink channel as 0.

Optionally, the first indication information may indicate a channel access type and/or a CPE length.

Optionally, the first indication information may be channel access indication information indicating a channel access type and a CPE length that are jointly coded from a channel access parameter set.

Optionally, when the terminal device determines that the channel access type corresponding to the first uplink channel is Type 1 channel access, the processing unit 320 may be configured to:

determine, when the first uplink channel is a first Physical Uplink Control Channel (PUCCH), a CAPC corresponding to the first uplink channel as p=1;

determine, when the first uplink channel is a first Physical Uplink Shared Channel (PUSCH) and the first PUSCH includes no user data, the CAPC corresponding to the first uplink channel as p=1; or determine, when the first uplink channel is a first PUSCH and the first PUSCH includes user data, the CAPC corresponding to the first uplink channel according to a priority of the user data.

Optionally, the first indication information may be channel access indication information indicating a channel access type, a CPE length, and a CAPC that are jointly coded from a channel access parameter set, and when the terminal device determines that the channel access type corresponding to the first uplink channel is Type 1 channel access, the processing unit 320 may be configured to:

determine a CAPC corresponding to the first uplink channel according to the first indication information.

Optionally, the first indication information may be carried in the first DCI.

Optionally, the first uplink channel may be a first PUCCH, and the first DCI may include time domain position indication information and/or PUCCH resource indication information for the first PUCCH.

Optionally, the first indication information may be transmitted by the network device via Radio Resource Control (RRC) signaling or Medium Access Control Control Element (MAC CE) signaling.

Optionally, the first uplink channel may be a first PUSCH, the first indication information may be carried in second DCI for scheduling transmission of the first PUSCH, the first DCI may correspond to the first PUCCH, and the first PUSCH and the first PUCCH may at least partially overlap in time domain.

Optionally, the first DCI may correspond to first feedback information, and the first feedback information may include at least one of:

feedback information corresponding to the sidelink transmission of the terminal device scheduled by the first DCI;

corresponding feedback information when the first DCI activates a sidelink CG or SPS configuration of the terminal device; or corresponding feedback information when the first DCI deactivates the sidelink CG or SPS configuration of the terminal device.

Optionally, the first DCI being used to schedule the sidelink transmission of the terminal device may include:

the first DCI being used to schedule at least one of a Physical Sidelink Control Channel (PSCCH) or a Physical Sidelink Shared Channel (PSSCH) of the terminal device.

Optionally, the first DCI may correspond to a first DCI format, and the first DCI format may include at least one of DCI format 3_0 or DCI format 3_1.

Optionally, the first DCI may include second indication information indicating at least one of:

an index of a scheduled group;

a New Feedback Indicator (NFI) for the scheduled group;

a number of feedback groups;

an NFI for a non-scheduled group; or a total sidelink assignment index (T-SAI) for the non-scheduled group.

Optionally, the terminal device may be configured with an enhanced type, eType-2, codebook feedback mode.

Optionally, the first DCI may include third indication information indicating whether to request a Type-3 codebook feedback.

Optionally, the terminal device may be configured with a Type-3 codebook feedback mode.

Optionally, the processing unit 320 may be configured to:

determine the channel access parameter corresponding to the first uplink channel according to the predetermined rule, where the first DCI does not include the first indication information that is channel access indication information.

Optionally, in some embodiments, the above communication unit may be a communication interface or a transceiver, or an input/output interface of a communication chip or a system-on-chip. The above processing unit may be one or more processors.

It should be understood that the terminal device 300 according to the embodiment of the present disclosure may correspond to the terminal device in the method embodiment of the present disclosure, and the above and other operations and/or functions of the respective units in the terminal device 300 are provided for the purpose of implementing the process flow corresponding to the terminal device in the method 200 shown in FIG. 2, and details thereof will be not omitted here for brevity.

FIG. 4 shows a schematic block diagram of a network device 400 according to an embodiment of the present disclosure. As shown in FIG. 4, the network device 400 includes:

a communication unit 410 configured to transmit first Downlink Control Information (DCI) and first indication information to a terminal device, where the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and the first indication information is used to determine a channel access parameter corresponding to the first uplink channel.

Optionally, the channel access parameter corresponding to the first uplink channel may include at least one of: a channel access type, a Cyclic Prefix Extension (CPE) length, a Channel Access Priority Class (CAPC), or a channel access process.

Optionally, the first indication information being used to determine the channel access parameter corresponding to the first uplink channel may include at least one of:

when the first indication information indicates that the first uplink channel corresponds to a second channel access type, the terminal device determining that the first uplink channel corresponds to the second channel access type;

the terminal device determining a channel access type corresponding to the first uplink channel according to the first indication information;

when the first indication information indicates that the first uplink channel corresponds to a second channel access process, the terminal device determining that the first uplink channel corresponds to the second channel access process; or the terminal device determining a channel access process corresponding to the first uplink channel according to the first indication information.

Optionally, the second channel access type may include one of Type 2A channel access, Type 2B channel access or Type 2C channel access.

Optionally, the channel access type indicated by the first indication information may include one of: Type 1 channel access, Type 2A channel access, Type 2B channel access, or Type 2C channel access.

Optionally, the second channel access process may include at least one of:

the second channel access process including a channel access process without channel sensing;

the second channel access process including a channel access process sharing Channel Occupancy Time (COT) channel sensing;

the second channel access process including one of a channel access process sharing COT channel sensing and a channel access process without channel sensing; or the second channel access process including a channel access process initiating COT channel sensing.

Optionally, the channel access process corresponding to the first uplink channel may include one of a channel access process initiating COT channel sensing, a channel access process sharing COT channel sensing, or a channel access process without channel sensing.

Optionally, the first indication information being used to determine the channel access parameter corresponding to the first uplink channel may include:

the terminal device determining a CPE length corresponding to the first uplink channel according to the first indication information.

Optionally, the first indication information may indicate a channel access type and/or a CPE length.

Optionally, the first indication information may be channel access indication information indicating a channel access type and a CPE length that are jointly coded from a channel access parameter set.

Optionally, the first indication information may be channel access indication information indicating a channel access type, a CPE length, and a CAPC that are jointly coded from a channel access parameter set, and when the terminal device determines that the channel access type corresponding to the first uplink channel is Type 1 channel access, the terminal device may determine a CAPC corresponding to the first uplink channel according to the first indication information.

Optionally, the communication unit 410 may be configured to:

transmit the first DCI to the terminal device, the first DCI including the first indication information.

Optionally, the first uplink channel may be a first PUCCH, and the first DCI may include time domain position indication information and/or PUCCH resource indication information for the first PUCCH.

Optionally, the communication unit 410 may be configured to:

transmit the first DCI to the terminal device, and transmit the first indication information to the terminal device via Radio Resource Control (RRC) signaling or Medium Access Control Control Element (MAC CE) signaling.

Optionally, the communication unit 410 may be configured to:

transmit the first DCI and second DCI to the terminal device, the second DCI including the first indication information, the first uplink channel being a first PUSCH, the second DCI being used to schedule transmission of the first PUSCH, the first DCI corresponding to the first PUCCH, and the first PUSCH and the first PUCCH at least partially overlapping in time domain.

Optionally, the first DCI may correspond to first feedback information, and the first feedback information may include at least one of:

feedback information corresponding to the sidelink transmission of the terminal device scheduled by the first DCI;

corresponding feedback information when the first DCI activates a sidelink CG or SPS configuration of the terminal device; or corresponding feedback information when the first DCI deactivates the sidelink CG or SPS configuration of the terminal device.

Optionally, the first DCI being used to schedule the sidelink transmission of the terminal device may include:

the first DCI being used to schedule at least one of a Physical Sidelink Control Channel (PSCCH) or a Physical Sidelink Shared Channel (PSSCH) of the terminal device.

Optionally, the first DCI may correspond to a first DCI format, and the first DCI format may include at least one of DCI format 3_0 or DCI format 3_1.

Optionally, the first DCI may include second indication information indicating at least one of:

an index of a scheduled group;

a New Feedback Indicator (NFI) for the scheduled group;

a number of feedback groups;

an NFI for a non-scheduled group; or a total sidelink assignment index (T-SAI) for the non-scheduled group.

Optionally, the network device 400 may further include:

a processing unit 420 configured to configure an enhanced type, eType-2, codebook feedback mode for the terminal device.

Optionally, the first DCI may include third indication information indicating whether to request a Type-3 codebook feedback.

Optionally, the network device 400 may further include:

a processing unit 420 configured to configure a Type-3 codebook feedback mode for the terminal device.

Optionally, in some embodiments, the above communication unit may be a communication interface or a transceiver, or an input/output interface of a communication chip or a system-on-chip. The above processing unit may be one or more processors.

It should be understood that the network device 400 according to the embodiment of the present disclosure may correspond to the network device in the method embodiment of the present disclosure, and the above and other operations and/or functions of the respective units in the network device 400 are provided for the purpose of implementing the process flow corresponding to the network device in the method 200 shown in FIG. 2, and details thereof will be not omitted here for brevity.

Figure 5:
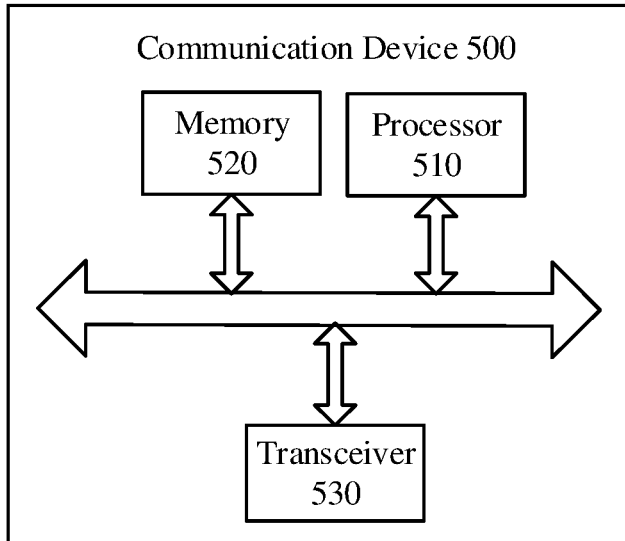
FIG. 5 is a schematic block diagram of a communication device according to an embodiment of the present disclosure.

FIG. 5 is a schematic diagram showing a structure of a communication device 500 according to an embodiment of the present disclosure. The communication device 500 shown in FIG. 5 includes a processor 510, and the processor 510 can invoke and execute a computer program from a memory to implement the method in the embodiment of the present disclosure.

Optionally, as shown in FIG. 5, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 5, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the network device according to the embodiment of the present disclosure, and the communication device 500 may implement the corresponding processes implemented by the network device in any of the methods according to the embodiments of the present disclosure. For the sake of brevity, details thereof will be omitted here.

Optionally, the communication device 500 may specifically be the terminal device according to the embodiment of the present disclosure, and the communication device 500 may implement the corresponding processes implemented by the terminal device in any of the methods according to the embodiments of the present disclosure. For the sake of brevity, details thereof will be omitted here.

Figure 6:
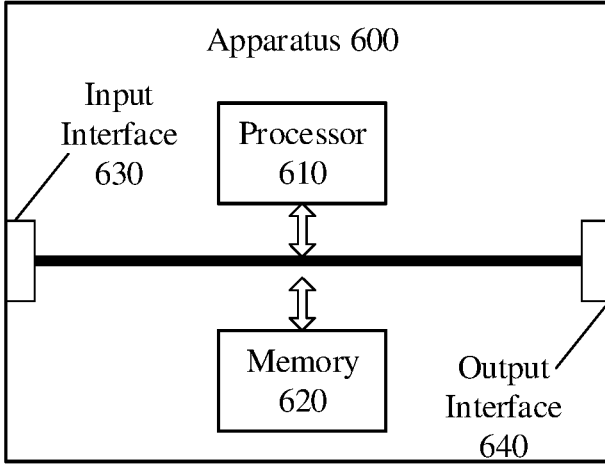
FIG. 6 is a schematic block diagram of an apparatus according to an embodiment of the present disclosure.

FIG. 6 is a schematic diagram showing a structure of an apparatus according to an embodiment of the present disclosure. The apparatus 600 shown in FIG. 6 includes a processor 610, and the processor 610 can invoke and execute a computer program from a memory to implement the method in the embodiment of the present disclosure.

Optionally, as shown in FIG. 6, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

Figure 7:
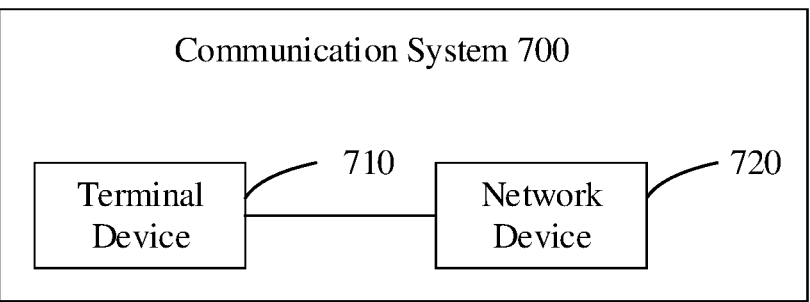
FIG. 7 is a schematic block diagram of a communication system according to an embodiment of the present disclosure.

FIG. 7 is a schematic block diagram showing a communication system 700 according to an embodiment of the present disclosure. As shown in FIG. 7, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
  receiving, by a terminal device, first Downlink Control Information (DCI) transmitted by a network device, wherein the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and
  determining, by the terminal device, a channel access parameter corresponding to the first uplink channel according to first indication information and a predetermined rule;
  wherein determining, by the terminal device, the channel access parameter corresponding to the first uplink channel according to the first indication information and the predetermined rule comprises:
  the predetermined rule predefining that the first uplink channel corresponds to a first channel access type, and when the first indication information indicates that the first uplink channel corresponds to a second channel access type, determining, by the terminal device, that the first uplink channel corresponds to the second channel access type;
  wherein the first channel access type comprises Type 1 channel access, and the second channel access type comprises one of Type 2A channel access, Type 2B channel access, or Type 2C channel access.

2. The method according to claim 1, wherein the channel access parameter corresponding to the first uplink channel comprises at least one of: a channel access type, a Cyclic Prefix Extension (CPE) length, a Channel Access Priority Class (CAPC), or a channel access process.

3. The method according to claim 1, wherein determining, by the terminal device, the channel access parameter corresponding to the first uplink channel according to the first indication information and the predetermined rule further comprises:
  the predetermined rule predefining that the first uplink channel corresponds to a first channel access process, and when the first indication information indicates that the first uplink channel corresponds to a second channel access process, determining, by the terminal device, that the first uplink channel corresponds to the second channel access process.

4. The method according to claim 1, wherein determining, by the terminal device, the channel access parameter corresponding to the first uplink channel according to the first indication information and the predetermined rule further comprises:
  determining, by the terminal device, a CPE length corresponding to the first uplink channel according to the first indication information; or
  determining, by the terminal device, the CPE length corresponding to the first uplink channel as 0.

5. The method according to claim 1, wherein the first indication information indicates a channel access type and/or a CPE length.

6. The method according to claim 1, wherein the first indication information is carried in the first DCI, wherein the first uplink channel is a first PUCCH, and the first DCI comprises time domain position indication information and/or PUCCH resource indication information for the first PUCCH, or
  wherein the first indication information is transmitted by the network device via Radio Resource Control (RRC) signaling or Medium Access Control Control Element (MAC CE) signaling.

7. The method according to claim 1, wherein the first DCI corresponds to first feedback information, and the first feedback information comprises at least one of:
  feedback information corresponding to the sidelink transmission of the terminal device scheduled by the first DCI;
  corresponding feedback information when the first DCI activates a sidelink CG or SPS configuration of the terminal device; or
  corresponding feedback information when the first DCI deactivates the sidelink CG or SPS configuration of the terminal device.

8. The method according to claim 1, wherein the first DCI being used to schedule the sidelink transmission of the terminal device comprises:
  the first DCI being used to schedule at least one of a Physical Sidelink Control Channel (PSCCH) or a Physical Sidelink Shared Channel (PSSCH) of the terminal device.

9. The method according to claim 1, wherein the first DCI corresponds to a first DCI format, and the first DCI format comprises at least one of DCI format 3_0 or DCI format 3_1.

10. The method according to claim 1, wherein the first DCI comprises third indication information indicating whether to request a Type-3 codebook feedback.

11. The method according to claim 1, wherein determining, by the terminal device, the channel access parameter corresponding to the first uplink channel according to the first indication information and the predetermined rule further comprises:
  determining, by the terminal device, the channel access parameter corresponding to the first uplink channel according to the predetermined rule, wherein the first DCI does not include the first indication information that is channel access indication information.

12. A terminal device, comprising a processor and a memory, wherein the memory has a computer program stored thereon, and the processor is configured to invoke and execute the computer program stored in the memory to:
  receive first Downlink Control Information (DCI) transmitted by a network device, wherein the first DCI is used to schedule a sidelink transmission of the terminal device, or the first DCI is used to activate a sidelink Configured Grant (CG) or Semi-Persistent Scheduling (SPS) configuration of the terminal device, or the first DCI is used to deactivate a sidelink CG or SPS configuration of the terminal device, the first DCI corresponding to first feedback information that is transmitted via a first uplink channel on a shared spectrum; and determine a channel access parameter corresponding to the first uplink channel according to first indication information and a predetermined rule;

wherein determining the channel access parameter corresponding to the first uplink channel according to the first indication information and the predetermined rule comprises:

the predetermined rule predefining that the first uplink channel corresponds to a first channel access type, and when the first indication information indicates that the first uplink channel corresponds to a second channel access type, determining that the first uplink channel corresponds to the second channel access type;

wherein the first channel access type comprises Type 1 channel access, and the second channel access type comprises one of Type 2A channel access, Type 2B channel access, or Type 2C channel access.

13. The terminal device according to claim 12, wherein the channel access parameter corresponding to the first uplink channel comprises at least one of: a channel access type, a Cyclic Prefix Extension (CPE) length, a Channel Access Priority Class (CAPC), or a channel access process.

14. The terminal device according to claim 12, wherein determining the channel access parameter corresponding to the first uplink channel according to the first indication information and the predetermined rule further comprises:

the predetermined rule predefining that the first uplink channel corresponds to a first channel access process, and when the first indication information indicates that the first uplink channel corresponds to a second channel access process, determining that the first uplink channel corresponds to the second channel access process.

15. The terminal device according to claim 12, wherein determining the channel access parameter corresponding to the first uplink channel according to the first indication information and the predetermined rule further comprises:

determining a CPE length corresponding to the first uplink channel according to the first indication information; or determining the CPE length corresponding to the first uplink channel as 0.

16. The terminal device according to claim 12, wherein the first indication information indicates a channel access type and/or a CPE length.

17. The terminal device according to claim 12, wherein the first indication information is carried in the first DCI, wherein the first uplink channel is a first PUCCH, and the first DCI comprises time domain position indication information and/or PUCCH resource indication information for the first PUCCH, or wherein the first indication information is transmitted by the network device via Radio Resource Control (RRC) signaling or Medium Access Control Control Element (MAC CE) signaling.

18. The terminal device according to claim 12, wherein the first DCI corresponds to first feedback information, and the first feedback information comprises at least one of:

feedback information corresponding to the sidelink transmission of the terminal device scheduled by the first DCI;

corresponding feedback information when the first DCI activates a sidelink CG or SPS configuration of the terminal device; or corresponding feedback information when the first DCI deactivates the sidelink CG or SPS configuration of the terminal device.

19. The terminal device according to claim 12, wherein the first DCI being used to schedule the sidelink transmission of the terminal device comprises:

the first DCI being used to schedule at least one of a Physical Sidelink Control Channel (PSCCH) or a Physical Sidelink Shared Channel (PSSCH) of the terminal device.

20. The terminal device according to claim 12, wherein the first DCI corresponds to a first DCI format, and the first DCI format comprises at least one of DCI format 3_0 or DCI format 3_1.

* * * * *